March 5, 1968  D. J. LEM  3,372,375
ERROR DETECTION SYSTEM
Filed May 5, 1964  5 Sheets-Sheet 3

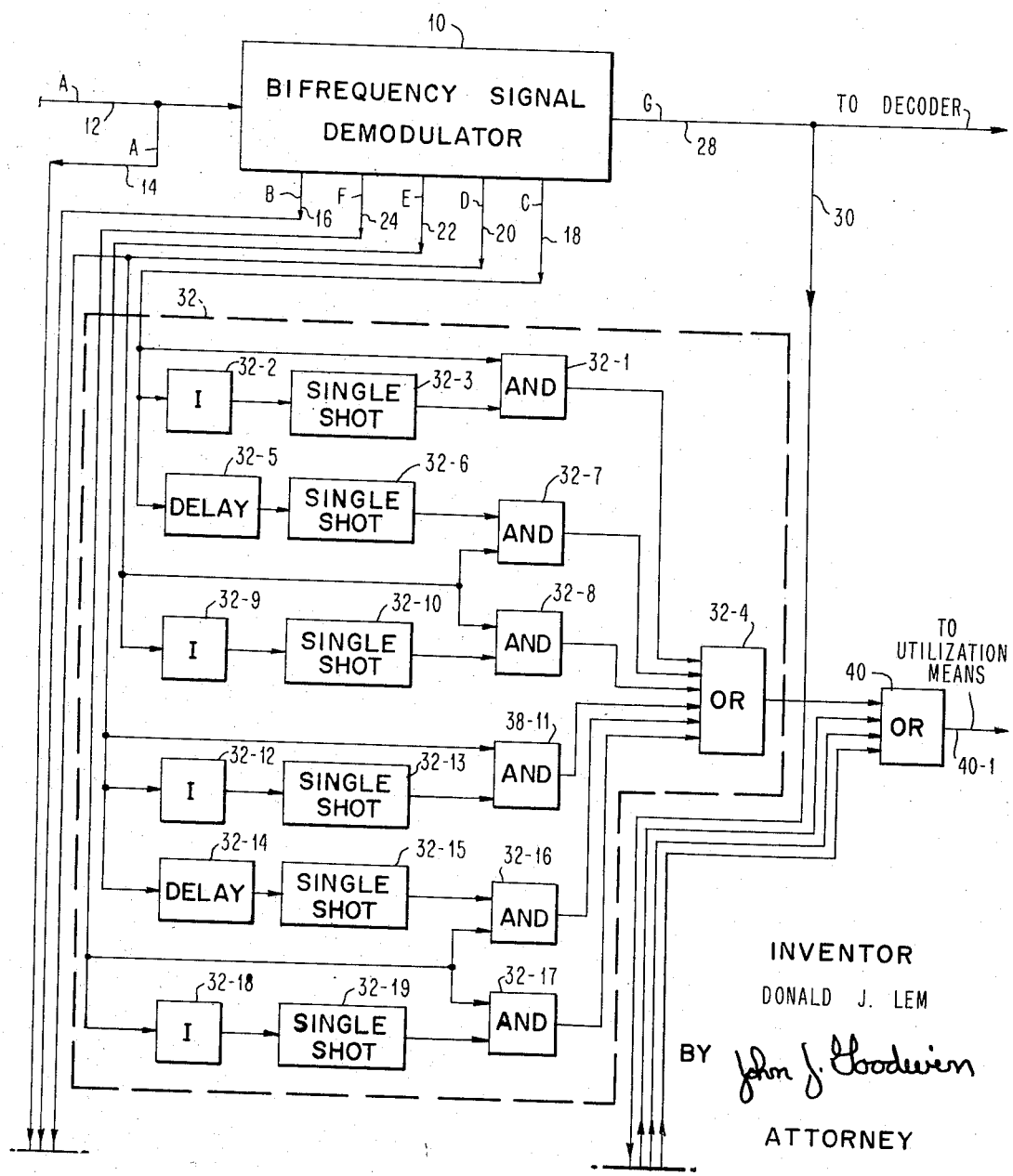

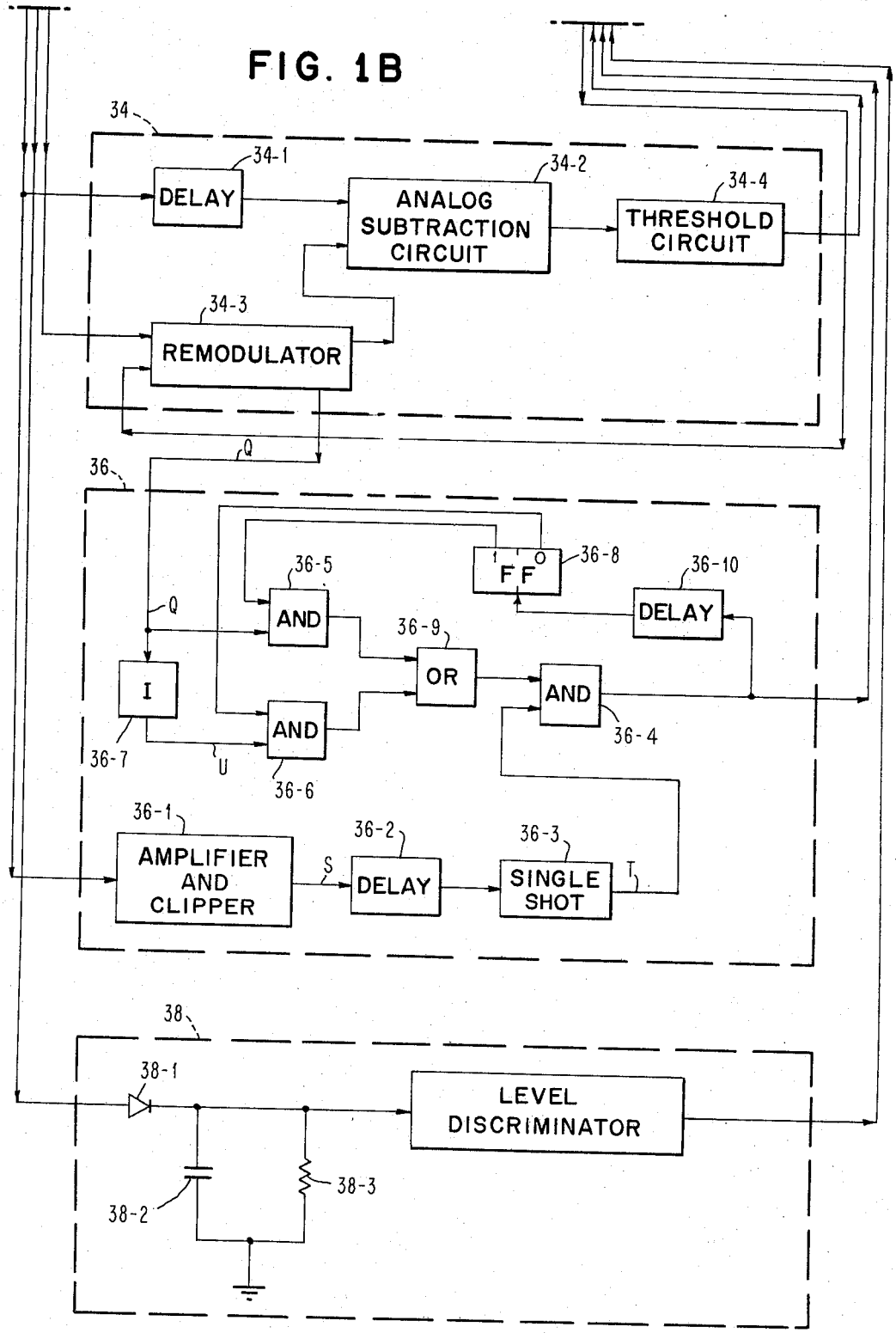

March 5, 1968     D. J. LEM     3,372,375
ERROR DETECTION SYSTEM
Filed May 5, 1964     5 Sheets-Sheet 4

United States Patent Office 3,372,375
Patented Mar. 5, 1968

3,372,375
ERROR DETECTION SYSTEM
Donald J. Lem, Peekskill, N.Y., assignor to International Business Machines Corporation, New York, N.Y., a corporation of New York
Filed May 5, 1964, Ser. No. 365,028
11 Claims. (Cl. 340—146.1)

ABSTRACT OF THE DISCLOSURE

An error checking device for a bi-frequency data signal analyzes the signal as it is decoded to detect erroneous data reception. The factors checked are (1) signal distortion as evidenced by a too short time interval between any two crossings of the zero amplitude reference by the received signal, (2) amplitude distortion which reduces the received signal below a safe level, (3) phase distortion caused by noise and putting a reconstituted signal out of phase with the transmitted signal and (4) decoder clock amplitude which should be at least up to a safe amplitude.

Objects of the invention

The present invention relates to a system for detecting errors in a coded signal, and more particularly to a system for analyzing a received signal for errors prior to demodulation.

A common technique employed in the transmission of digital coded data is to convert the coded signals into another form prior to transmission, the other form being more suitable to the transmission medium. At the receiver the transmitted signals are then reconverted to the original code form. For example, a well known form of code is the non-return to zero, or NRZ. In the NRZ code a data change from binary "1" to binary "0" or vice versa is manifested by a signal level change, and the signal remains at such level until the occurrence of the next binary data change, at which point the signal returns to its first level. This type signal coding is not efficient for single sideband or vestigial sideband transmission systems due to the large direct current component. Thus, a common technique is to convert the NRZ coded signal into a code form more efficient for transmission purposes, such as the bi-frequency form wherein a "0" bit is represented by a sinusoidal waveform having twice the frequency of the sinusoidal waveform representing a "1" bit. At the receiver, the transmitted bi-frequency signal is reconverted to the NRZ form.

Very often errors will occur in the digital data signal due to modulation and transmission. In such instances the errors will be carried through the receiver demodulation stages and remain in the resultant NRZ signal. In the present invention a system is provided which will sample the received signal for various erroneous conditions and will provide an error signal to indicate the portion of the resultant NRZ signal which is in error.

An object of the present invention is to provide an error detection system for digital data transmission systems.

Another object of the present invention is to provide an error detection system which samples a transmitted data signal prior to demodulation.

A further object of the present invention is to provide an error detection system which indicates the presence of phase, amplitude, and polarity errors within a data signal.

A still further object of the present invention is to provide an error detection system which samples an incoming data signal to determine errors, and which indicates the portion of the decoded data signal being in error.

The foregoing and other objects, features and advantages of the invention will be apparent from the following more particular description of a preferred embodiment of the invention, as illustrated in the accompanying drawings.

Description of the drawings

In the drawings:

FIG. 1 indicates how FIGS. 1A and 1B are to be combined.

FIGS. 1A and 1B combined illustrate a schematic block diagram of an embodiment of an error detection system in accordance with the principles of the present invention.

Detailed description of the preferred embodiment

Figure 2:
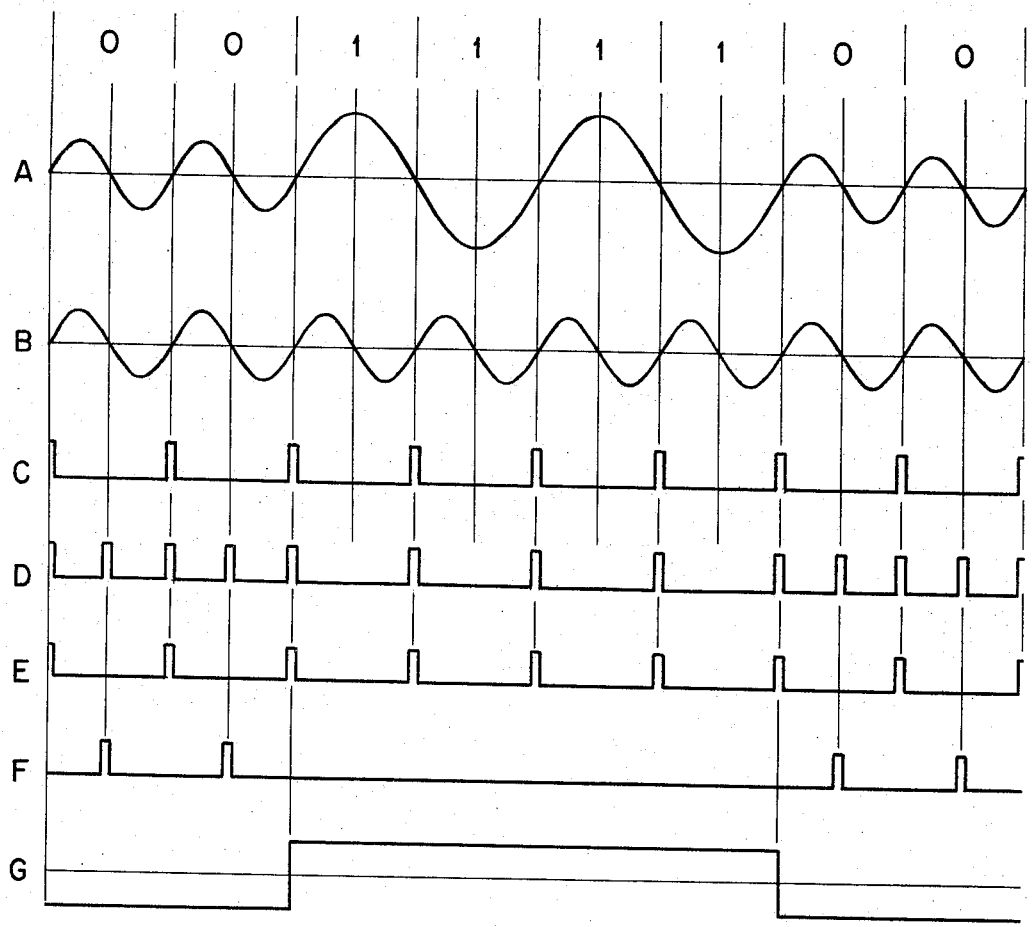
FIG. 2 is a series of waveforms representative of signals associated with the system of FIGS. 1A and 1B.

Referring to FIGS. 1A and 1B, an error detection system is shown including a bi-frequency demodulator 10 which forms part of the receiver section. The bi-frequency demodulator 10 is responsive to the bi-frequency data signal and provides the NRZ form of the data therein. Referring to FIG. 2, a series of waveforms are shown which represent the various signals at different portions of bi-frequency demodulator 10. Waveform A represents a typical bi-frequency input signal for the binary data 00111100, the "0" bits being represented by a full cycle of sine wave with a period equal to the bit period, and a "1" bit being represented by a one-half cycle of sine wave having a period twice the bit period. Waveform B represents the sinusoidal clock signal; waveform C represents the pulsed tuned clock signal; waveform D is a series of pulses representing the zero crossings of waveform A. Waveform E represents the pulse output signal from the untuned clock. Waveform F represents the midvolt crossing signal, that is, a signal having a pulse at the zero crossing of the higher frequency "0" bit portions of the bi-frequency waveform A. Waveform G is the NRZ signal from the output of bi-frequency demodulator 10.

Figure 3:
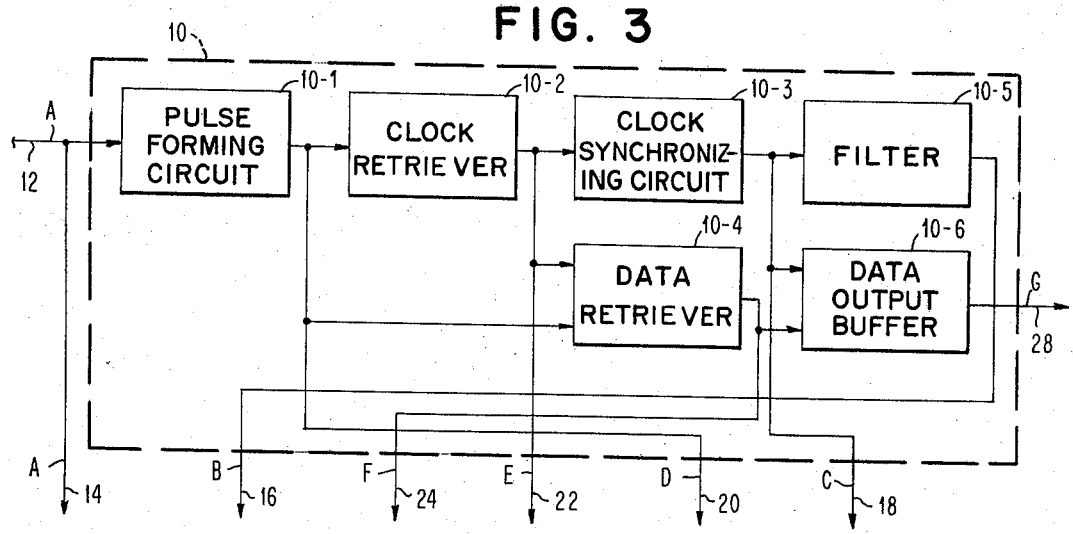
FIG. 3 is a detailed diagram of a demodulator circuit which may be employed in the system of FIGS. 1A and 1B.

The bi-frequency demodulator 10 is a conventional circuit which is shown in more detail in FIG. 3. The bi-frequency demodulator 10 includes a pulse forming circuit 10–1, a clock retriever circuit 10–2, a clock synchronizing circuit 10–3, a data retriever circuit 10–4, a filter 10–5, and a data output buffer 10–6. The pulse forming network 10–1 is connected to lead 12 and is responsive to the bi-frequency signal A (FIG. 2) from the single sideband demodulator of the receiver. The purpose of the pulse forming circuit 10–1 is to overcome any phase variation and distortion in the bi-frequency signal and provide a pulse for every zero crossing thereof. The output signal from pulse forming circuit 10–1 is represented by waveform D, FIG. 2.

The clock retriever circuit 10–2 is responsive to the zero crossing pulses from pulse forming circuit 10–1 and selects those pulses which occur at the end of the data bit periods and provides an output as shown in waveform E of FIG. 2. The data retriever 10-4 is also responsive to the zero crossing pulses from pulse forming circuit 10-1 and selects those pulses which represent the zero crossings of the 0 bit signals, as shown by waveform F, FIG. 2. The clock synchronizing circuit 10-3 is responsive to the pulses from clock retriever circuit 10-3 and provides an improved square wave pulse for each retrieved clock pulse as shown by waveform C, FIG. 2. The filter 10-6 is responsive to the squared clock pulses from synchronizing circuit 10-3 and provides a smoothed signal therefrom as shown by waveform B, FIG. 2. The data output buffer circuit 10-6 is responsive to the synchronized clock signal from circuit 10-3 and the retrieved data signal 10-4 and provides a bi-level NRZ signal representative thereof on lead 28 as shown by waveform G, FIG. 2.

Referring again to FIGS. 1A and 1B, it is seen that waveform A appears on input lead 12 and lead 14. Waveform B appears on lead 16, waveform C appears on lead 18, waveform D appears on lead 20, waveform E appears on lead 22, waveform F appears on lead 24, and waveform G appears on leads 28 and 30.

The error detection system of the present invention is connected to bi-frequency demodulator 10 and the input and output leads 12 and 28 thereof. The error detection system includes four basic detection units; the distorted zero crossing detector 32, the amplitude distortion detector 34, the polarity detector 36, and the clock amplitude detector 38. The outputs of each of these four basic detection units are connected as inputs to an "OR" circuit 40.

The distorted zero crossing detector 32 includes an "AND" circuit 32-1 having one input connected directly to lead 18 and another input connected to lead 18 via an inverter circuit 32-2 and a single-shot trigger circuit 32-3. This arrangement examines the tuned clock signals C on lead 18 to determine if a required minimum space is present between each clock pulse. The single shot circuit 32-3 is selected to provide a pulse width equal to the required minimum space. Inverter 32-2 inverts the positive tuned clock pulses C so that the now positive going trailing edge of each clock pulse triggers the single-shot circuit. Thus each clock pulse is applied directly to "AND" circuit 32-1 and at the termination thereof a pulse is applied to "AND" circuit 32-1 for a given time period. If the next clock pulse is applied to the other input of "AND" circuit 32-1 during this period it is an indication that less than the minimum space exists between tuned clock pulses and therefore that a clock pulse is out of phase. The error signal output of "AND" circuit 32-1 is gated through "OR" circuit 32-4 to "OR" circuit 40 where it results in an error signal on lead 40-1.

The clock signal C on lead 18 is also applied through a delay circuit 32-5 to a single-shot circuit 32-6, the output of which is coupled to an "AND" circuit 32-7. The zero volt crossing signal D on lead 20 is applied directly to the other input of "AND" circuit 32-7. This arrangement compares the tuned clock pulses C with the zero volt crossing pulses D. To be in correct phase each clock pulse should be time coincident within given limits with the zero crossing pulses which occur at the end of each bit period. To determine whether this condition is present the tuned clock pulses C on lead 18 are shifted a distance beyond the aforesaid given limits by delay circuit 32-5 and then actuate a single shot trigger 32-6 which provides an output pulse having a time duration which is equal to the period during which a tuned clock pulse is unacceptable. If a zero crossing pulse occurs during this period, it indicates that the tuned clock pulse is out of phase. Thus the output signal from single shot circuit 32-6 and the zero crossing signal D on lead 20 are applied to "AND" circuit 32-7. An output signal from "AND" circuit 32-7 indicates a phase error and is applied through "OR" circuit 32-4 to "OR" circuit 40.

The zero crossing signal D on lead 20 is also applied directly to an "AND" circuit 32-8. The zero crossing signal D is also applied to an inverter circuit 32-9 which is coupled to a single shot circuit 32-10, the output of which is in turn connected to "AND" circuit 32-8. This arrangement insures that a desired minimum spacing occurs between each of the zero volt crossing pulses. The zero volt crossing pulses D relate to the alternating bi-frequency signal A, and if any two pulses are close together it indicates distortion. Thus the zero volt crossing pulses on lead 20 are inverted by circuit 32-9 and the trailing edge of each zero crossing pulse actuates single shot circuit 32-10. The output signal from single shot circuit 32-10 has a pulse width equal to the minimum distance required between zero volt crossing pulses. The output signal from single shot circuit 32-10 is applied to "AND" circuit 32-8, and if the next zero volt pulse occurs and is applied to "AND" circuit 32-8 during the occurrence of the output signal from single shot circuit 32-10, then an output signal will be produced from "AND" circuit 32-8 indicating that less than the minimum distance is present between such zero volt crossing pulses. The output signal from "AND" circuit 32-8 is conducted through "OR" circuit 32-4 to "OR" circuit 40.

The untuned clock signal E on lead 22 is applied directly to an "AND" circuit 38-11 and also via an inverter circuit 32-12 to a single-shot trigger circuit 32-13. This arrangement examines the untuned clock signals E on lead 22 to determine if a required minimum space is present between each clock pulse. The single shot circuit 32-13 is selected to provide a pulse width equal to the required minimum space. Inverter 32-12 inverts the positive untuned clock pulses E so that the now positive going trailing edge of each untuned clock pulse triggers the single shot circuit. Thus each untuned clock pulse is applied directly to "AND" circuit 32-11 and at the duration thereof a pulse is applied to "AND" circuit 32-11 for a given time period. If another untuned clock pulse is applied to the other input of "AND" circuit 32-11 during this period it is an indication that less than the minimum space exists between untuned clock pulses and therefore that an untuned clock pulse is out of phase. The "AND" circuit 32-11 will produce an output signal in such instance which is gated through "OR" circuit 32-4 to "OR" circuit 40.

The untuned clock signal E on lead 22 is also applied through a delay circuit 32-14 to a single shot circuit 32-15, the output of which is coupled to an "AND" circuit 32-16. The mid-volt crossing signal F on lead 24 is applied directly to the other input of "AND" circuit 32-16. This arrangement compares the untuned clock pulses E with the mid-volt crossing pulses F. To be in correct phase each untuned clock pulse should be time coincident within given limits with the mid-volt crossing pulses which occur at the end of each bit period. To determine whether this condition is present the untuned clock pulses E on lead 20 are shifted a distance beyond the aforesaid given limits by delay circuit 32-14 and then actuate the single shot trigger 32-15 which provides an output pulse having a time duration which is equal to the unacceptable amount of phase duration of the untuned clock pulses. If a mid-volt crossing pulse occurs during this period, it indicates that the untuned clock pulse is out of phase. Thus the output signal from single shot circuit 32-15 and the mid-volt crossing signal F on lead 24 are applied to "AND" circuit 32-16. An output signal from "AND" circuit 32-16 indicates a phase error and is applied through "OR" circuit 32-4 to "OR" circuit 40.

The mid-volt crossing signal F on lead 24 is also applied directly to an "AND" circuit 32-17. The mid-volt crossing signal F is also applied to an inverter circuit 32-18 which is coupled to a single shot circuit 32-19, the output of which is in turn connected to "AND" circuit 32-17. This arrangement insures that a desired minimum spacing occurs between each of the mid-volt crossing pulses. The mid-volt crossing pulses F are derived from the alternating bi-frequency signal A, and if any two pulses are close together, it indicates distortion. Thus the mid-volt crossing pulses on lead 24 are inverted by circuit 32–18 and the trailing edge of each mid-volt crossing pulse actuates single shot circuit 32–19. The output signal from single shot circuit 32–19 has a pulse width equal to the minimum distance required between mid-volt crossing pulses. The output signal from single shot circuit 32–19 is applied to "AND" circuit 32–17, and if the next mid-volt crossing pulse occurs and is applied to "AND" circuit 32–17 during the occurrence of the output signal from single-shot circuit 32–19, then an output signal will be produced from "AND" circuit 32–17 indicating that less than the minimum distance is present between such mid-volt crossing pulses. The output signal from "AND" circuit 32–17 is conducted through "OR" circuit 32–4 to "OR" circuit 40.

Block 34 is an amplitude distortion detector which determines whether there is any amplitude variation of the incoming bi-frequency signal due to fading, etc.

Figure 4:
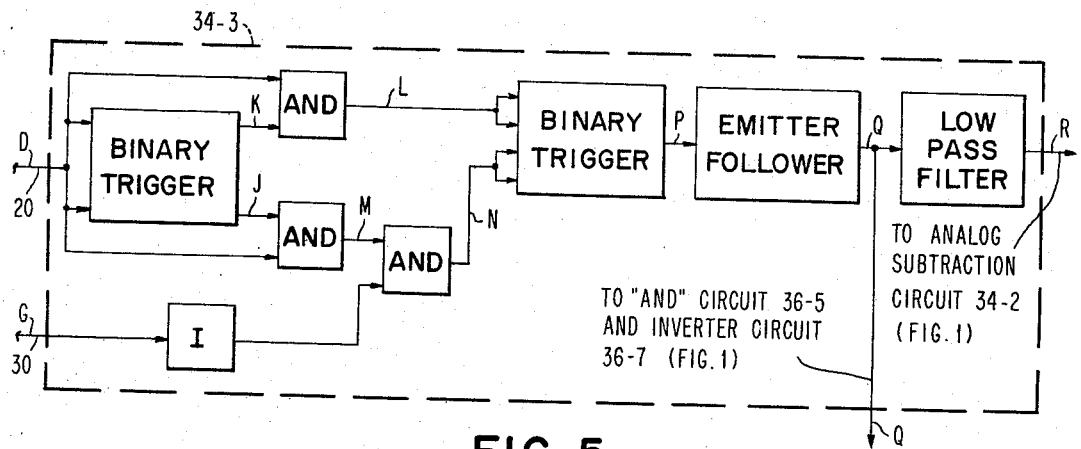
FIG. 4 is a detailed diagram of a demodulator circuit which may be employed in the system of FIGS. 1A and 1B.
Figure 5:
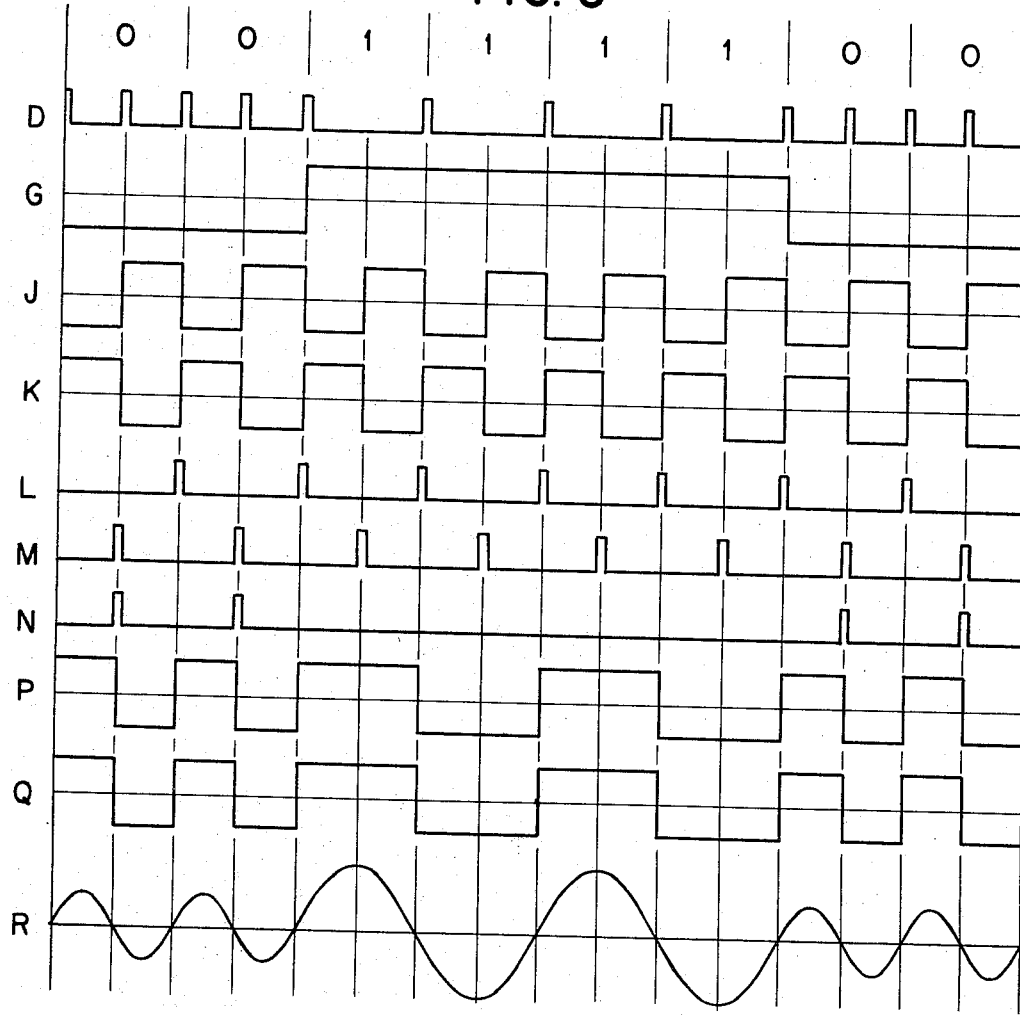
FIG. 5 is a series of waveforms representative of signals associated with the circuit of FIG. 4.

The incoming bi-frequency signal A on lead 12 is coupled via lead 14 and a delay circuit 34–1 to an analog subtraction circuit 34–2. The NRZ output signal G from demodulator 10 on lead 28 is coupled via a lead 30 to a remodulator circuit 34–3. The zero volt crossing signal D on lead 20 is also coupled to the input of remodulator 34–3. The remodulator 34–3 is a generally conventional modulator circuit which performs logical operations of the NRZ signal and produces a corresponding bi-frequency signal. A detailed circuit of remodulator 34–3 is shown in FIG. 4 and the signal waveforms associated with various components therein are shown in FIG. 5. The manner in which the output bi-frequency signal from remodulator 34–3 is produced from the NRZ signal G should be understandable to one skilled in the art. In FIG. 5, the modulated bi-frequency signal R is constructed from the demodulated NRZ data signal G. It should correspond with the bi-frequency input signal in phase and amplitude, and to determine this the incoming bi-frequency signal A on lead 12 is applied to analog subtraction circuit 34–2 via lead 14 and the bi-frequency signal R (FIG. 4) is also applied to circuit 34–1. Delay circuit 34–1 delays the incoming signal A an amount equal to the delay caused by demodulator 10 and remodulator 34–3. If the two signals differ, an error signal will be generated from subtraction circuit 34–2 and applied to a threshold circuit 34–4 set at a given amplitude level. The level of the error signal from subtraction circuit 34–2 is representative of the difference between the incoming bi-frequency signal A and the reconstructed bi-frequency signal R. If the difference is slight, it may be ignored, however, if the difference is greater than the given level of the threshold circuit 34–4, an output signal will be produced by threshold circuit 34–4 which is applied to "OR" circuit 40.

Figure 6:
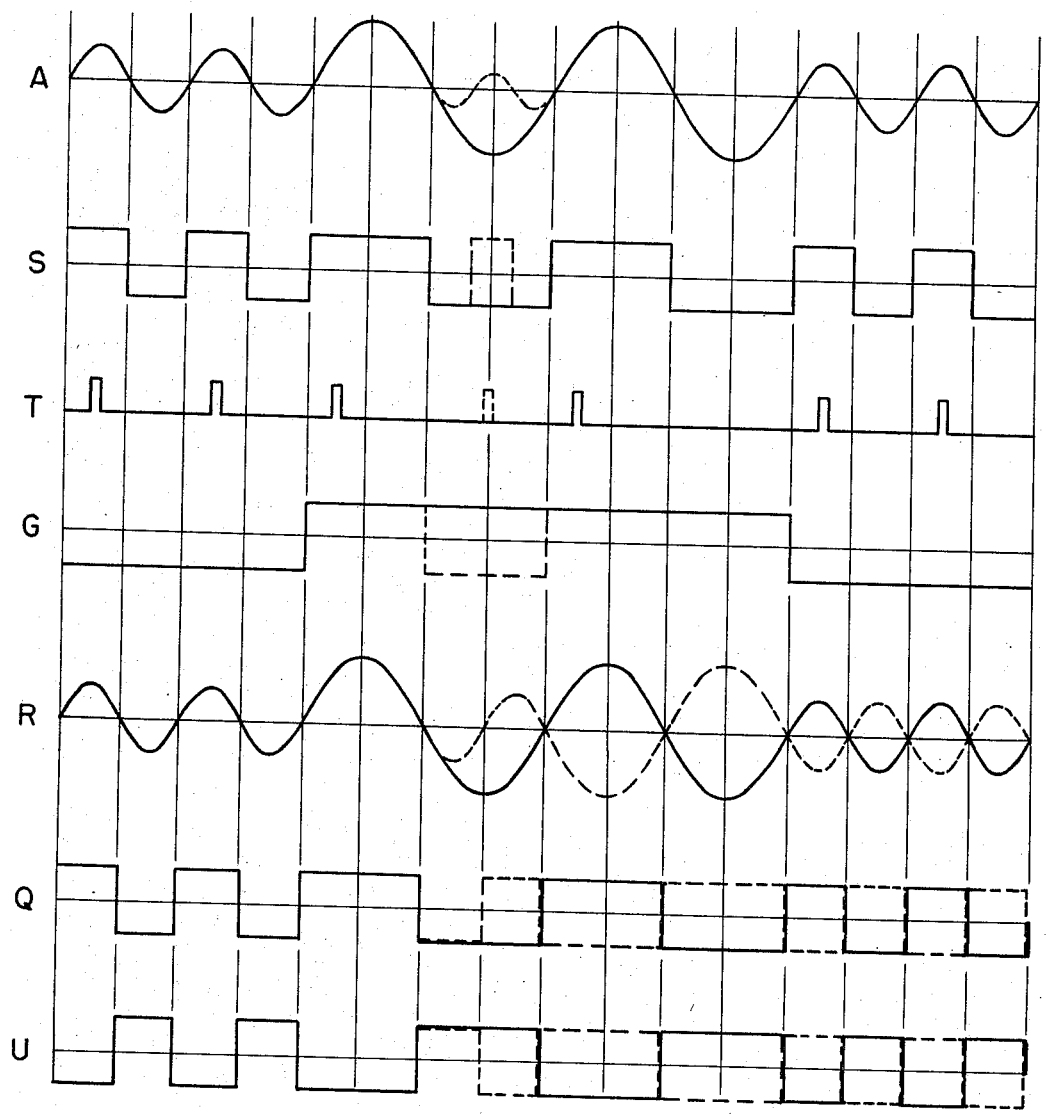
FIG. 6 is a series of waveforms useful in explaining the effect of an error in a signal associated with the system of FIG. 1.

Block 36 performs a check for polarity errors. If there is noise or some other undesirable occurrence during transmission, the incoming bi-frequency signal A may become distorted with regard to polarity and result in an erroneous NRZ signal on lead 28. Referring to FIG. 6, the normal bi-frequency waveform A is shown as a solid line, and a dotted portion is included to illustrate a typical distortion. The bi-frequency signal A will normally result in an NRZ signal G on lead 28 as shown by the solid line in FIG. 6, however, due to the distortion, the NRZ signal will be in error as represented by the dotted portion of waveform G, FIG. 6. In block 36, FIG. 1B, the bi-frequency signal A on lead 12 is applied via lead 14 to an amplifier and clipping circuit 36–1 which produces a square wave version of the bi-frequency signal. In FIG. 6 the output signal from amplifying and clipping circuit 36–1 is represented by waveform S. The erroneous portion of waveform S is represented by a dotted line. The output signal from amplifier and clipping circuit 36–1 is applied to a delay circuit 36–2 which delays the signal slightly before it is applied to a single-shot circuit 36–3. The single-shot circuit 36–3 generates a narrow pulse (approximately ¼ a bit period in length) in response to positive going portions of the delayed signal S from delay circuit 36–2. The output signal from single-shot circuit 36–3 is represented by waveform T in FIG. 6. It is noted that an additional pulse (dotted line) results in waveform T due to the distortion in waveform A. The output signal from single-shot circuit 36–3 (waveform T) is applied to an "AND" circuit 36–4.

In the discussion of FIG. 4 it was indicated how a bi-frequency waveform R (FIG. 5) could be derived from the NRZ signal G. In FIG. 4, prior to smoothing, the bi-frequency signal is in square waveform as shown by waveform Q (FIG. 5). The waveform Q signal from the emitter follower portion of remodulator 34–2 (FIG. 4) is coupled directly to an "AND" circuit 36–5 of block 36, FIG. 1B and to an "AND" circuit 36–6 via an inverter circuit 36–7 in block 36, FIG. 1B. The square waveform of bi-frequency signal derived from the NRZ signal G (and applied to "AND" circuit 36–5) is shown as waveform Q in FIG. 6 (the smoothed bi-frequency signal reconstructed from the NRZ signal G is shown for purposes of interest as waveform R in FIG. 6). In waveforms Q and R the dotted portions represent the erroneous change caused by the original distortion in waveform A. Waveform U represented the output signal from inverter circuit 36–7, i.e., the inverted form of waveform Q. A flip-flop 36–8 is included in block 36 of FIG. 1B and has its "1" output connected to "AND" circuit 36–5 and its "0" output connected to "AND" circuit 36–6. If the flip-flop is in its "1" state, the waveform Q signal (FIG. 6) will be gated through an "OR" circuit 3–9 to "AND" circuit 3–4, but if the flip-flop is in its "0" state, then the waveform U signal will be gated through "AND" circuit 36–6 and "OR" circuit 36–9 to "AND" circuit 36–4. Thus, at "AND" circuit 36–4 the waveform T signal (FIG. 6) will be gated against either the waveform Q or the waveform U signal (FIG. 6) depending on the state of flip-flop circuit 36–8.

Consider that the flip-flop 36–8 is in its "0" state and waveform U is being gated against waveform T at "AND" circuit 36–4. Consider also that no distortion is present in waveform A, that is, waveforms T and U are represented by the solid lines in FIG. 6. In such instance waveforms T and U are never positive at the same time and "AND" circuit 36–4 is never gated. If distortion is present in waveform A, the NRZ signal varies as shown by the dotted line in waveform G. The change in form of the NRZ signal causes the square wave bi-frequency signal to appear as shown in the dotted line portion of waveform Q and the dotted line portion of the inverse waveform U. It is noted that the NRZ waveform signal G now erroneously represents the binary word 000101100 instead of the intended 000111100.

At "AND" circuit 36–4 the pulse of waveform T following the distortion, i.e., the fifth pulse, will gate waveform U since the error caused a phase reversal in waveform U as shown by the dotted line portion. An output signal will therefore be produced by "AND" circuit 36–4 which is applied to "OR" circuit 40.

Since waveform U reversed phase, all the subsequent pulses of waveform T will continue to be gated through "AND" circuit 36–4 even though no further errors may occur. To prevent this occurrence the output signal from "AND" circuit 36–4 is also fed back through a delay circuit 36–10 to switch flip-flop 36–8. The amount of delay provided by circuit 36–10 is approximately ¼ of a bit period to allow possible level changes in waveforms Q and U. When flip-flop 36–8 switches, "AND" circuit 36–5 is gated and waveform Q is now applied to "AND" circuit 36–4. Thus, for all succeeding pulses of waveform T, waveform Q will be negative and "AND" circuit 36–4 will not be gated. If another error were to occur, then waveform Q would reverse polarity, "AND" circuit 36–4 will be gated and apply an erase signal to "OR" circuit 40, and flip-flop 36–8 will again be triggered.

In the preceding discussion it was assumed that flip-flop 36–8 was in its "0" state so that waveforms T and U were properly applied to "AND" circuit 36–4. It is possible that initially flip-flop 36–8 is in its opposite state so that waveform Q is applied to "AND" circuit 36–4. In such instance the first pulse of waveform T will be gated through "AND" circuit 36–4 and be applied to "OR" circuit 40. The output signal from "AND" circuit 36–4 however, is also fed back to trigger flip-flop 36–8 to thereafter cause waveform U to be applied to "AND" circuit 36–4. Thus, if the flip-flop circuit 36–8 is initially in the improper state with respect to the first signal data bit, the flip-flop will be brought into agreement at the cost of an initial incorrect error indication. If desired, all messages transmitted through the system could be initially preceded by a test bit for the purposes of synchronizing flip-flop 36–8 with the data signals.

Block 38 is responsive to the clock signal B on lead 16 and determines whether the D.C. level of the signal is above a given level. The clock signal B is half-wave rectified by diode 38–1 and smoothed to an approximate D.C. signal by the filter including capacitor 38–2 and resistor 38–3. The rectified and smoothed signal is then applied to an amplitude level discriminator 38–4 which will produce a signal if the signal level exceeds a given selected value. The output signal produced from level discriminator 38–4 is applied to "OR" circuit 40.

It is seen that each of the detection blocks 32, 34, 36 and 38 of FIGS. 1A and 1B provide an output signal upon the occurrence of a related error in the incoming bi-frequency signal. The output signals from each of the blocks 32, 34, 36 and 38 are applied to the "OR" circuit 40 which produces an error signal on lead 40–1 in response thereto. The occurrence of an error signal on lead 40–1 is indicative of an error in a portion of the incoming bi-frequency signal and consequently an error in the NRZ signal on lead 28. The error signal on lead 40–1 may be utilized in one of several possible ways, for example, if the transmission system employed redundancy, the error signal could, by known techniques, be used for error correction of the NRZ signal. The error signal might also be used as an erase signal, that is, to actuate a "don't know" signal which overrides the decoded portion of the NRZ signal in error. A third possible use of the error signal on lead 40–1 is as a feedback signal to the transmitter to request a retransmission of the portion of the message in error.

What has been described is a detection system for errors which may occur in a data transmission system. The incoming signal rather than the decoded version thereof is sampled for qualities which determine the possible errors and the sampled qualities are processed by detection circuits which cause an error signal to be produced in the event of an error occurring in the transmitted signal.

While the invention has been particularly shown and described with reference to a preferred embodiment thereof, it will be understood by those skilled in the art that various changes in form and details may be made therein without departing from the spirit and scope of the invention.

What is claimed is:

1. An error detection system for coded data signals comprising means for demodulating an alternating polarity coded data signal, said demodulating means including a pulse forming circuit responsive to said alternating polarity coded data signal to provide a pulse each time said coded data signal changes polarity, a clock retriever circuit coupled to the output of said pulse forming circuit to provide clock pulses synchronous with the data rate of said coded data signal, a clock synchronizing circuit coupled to the output of said clock retriever circuit for providing tuned clock pulses in response to said clock pulses, a filter circuit coupled to the output of said clock synchronizing circuit for smoothing said tuned clock pulses, a data retriever circuit coupled to the output of said pulse forming circuit and said clock retriever circuit for providing pulses in response to given data of said coded data signal, and a data output buffer circuit coupled to the output of said data retriever circuit and said clock synchronizing circuit for providing an output signal representative of the data manifested by said coded data signal, first means coupled to said demodulating means for providing an output signal when the relative phase of said coded data signal is distorted, said first means including devices coupled to the output of said clock synchronizing circuit for providing an output signal when the tuned clock pulses therefrom are spaced less than a given minimum distance, second means coupled to said demodulating means for providing an output signal when the amplitude of said coded data signal is distorted, third means coupled to said demodulating means for providing an output signal when the polarity of said coded data signal is incorrect, fourth means coupled to said demodulating means for providing an output signal when the direct current level of said coded data signal exceeds a given value, and means coupled to said first, second, third, and fourth means for providing an error signal upon the occurrence of an output signal from at least one of said first, second, third, and fourth means.

2. An error detection system according to claim 1 wherein said first means coupled to said demodulating means further includes means coupled to the output of said clock synchronizing circuit and said pulse forming circuit to compare the respective pulses therefrom and produce an output signal when said pulses are not time coincident.

3. An error detection system according to claim 1 wherein said first means coupled to said demodulating means further includes means coupled to the output of said pulse forming circuit for providing an output signal when the pulses therefrom are spaced less than a given minimum distance.

4. An error detection system according to claim 1 wherein said first means coupled to said demodulating means further includes means coupled to the output of said clock retriever circuit for providing an output signal when the clock pulses therefrom are spaced less than given minimum distance.

5. An error detection system according to claim 1 wherein said first means coupled to said demodulating means further includes means coupled to the output of said clock retriever circuit and said data retriever circuit to produce an output pulse when said pulses from said data retriever circuit occur less than a given phase distance from said clock pulses from said clock retriever circuit.

6. An error detection system according to claim 1 wherein said first means coupled to said demodulating means further includes means coupled to the output of said data retriever circuit to provide an output signal when the pulses therefrom are spaced less than a given minimum distance.

7. An error detection system according to claim 1 wherein said first means coupled to said demodulating means includes means coupled to the output of said clock synchronizing circuit for providing an output signal when the tuned clock pulses therefrom are spaced less than a given minimum distance, means coupled to the output of said clock synchronizing circuit and said pulse forming circuit to compare the respective pulses therefrom and produce an output signal when said pulses are not time coincident, means coupled to the output of said pulse forming circuit for providing an output signal when the pulses therefrom are spaced less than a given minimum distance, means coupled to the output of said clock retriever circuit for providing an output signal when the clock pulses therefrom are spaced less than a given minimum distance, means coupled to the output of said clock retriever circuit and said data retriever circuit to produce an output pulse when said pulses from said data retriever circuit occur less than a given phase distance from said clock pulses from said clock retriever circuit, and means coupled to the output of said data retriever circuit to provide an output signal when the pulses therefrom are spaced less than a given minimum distance.

8. An error detection system according to claim 7 wherein said second means coupled to said demodulating means for providing an output signal when the amplitude of said coded data signal is distorted includes, delay means responsive to said alternating polarity coded data signal for delaying said coded data signal a given amount, remodulator means coupled to said data output buffer of said demodulator means for providing an alternating polarity coded data signal in response to the rep-representative signal therefrom, means coupled to the output of said delay means and said remodulator means for producing an output signal when the amplitudes of the signals therefrom differ greater than a given amount, wherein said third means coupled to said demodulating means for providing an output signal when the polarity of said coded data signal is incorrect includes means coupled to said remodulator means of said second means for providing a first square wave signal which is a representation of said alternate polarity coded data signal of said remodulator, means for inverting said first square wave signal, means responsive to said alternate polarity coded signal applied to said demodulator for converting said alternating polarity coded signal into a second square wave signal which is a representation thereof, means responsive to said second square wave signal for producing narrow pulses in response to positive portions thereof, gating means for gating one of said first square wave signals and said inverted first square wave signal with said narrow pulses for producing an output signal when said input signals to said gating means are coincidently positive, and wherein said fourth means coupled to said demodulator means includes a threshold circuit coupled to the output of said filter circuit of said demodulator means for providing an output signal when the signal therefrom exceeds a given amplitude.

9. An error detection system according to claim 1 wherein said second means coupled to said demodulating means for providing an output signal when the amplitude of said coded data signal is distorted includes, delay means responsive to said alternating polarity coded data signal for delaying said coded data signal a given amount, remodulator means coupled to said data output buffer of said demodulator means for providing an alternating polarity coded data signal in response to the rep-representative signal therefrom, and means coupled to the output of said delay means and said remodulator means for producing an output signal when the amplitudes of the signals therefrom differ greater than a given amount.

10. An error detection system according to claim 1 wherein said third means coupled to said demodulating means for providing an output signal when the polarity of said coded data signal is incorrect includes means coupled to said remodulator means of said second means for providing a first square wave signal which is a representation of said alternate polarity coded data signal of said remodulator, means for inverting said first square wave signal, means responsive to said alternate polarity coded signal applied to said demodulator for converting said alternating polarity coded signal into a second square wave signal which is a representation thereof, means responsive to said second square wave signal for producing narrow pulses in response to positive portions thereof, gating means for gating one of said first square wave signals and said inverted first square wave signal with said narrow pulses for producing an output signal when said input signals to said gating means are coincidently positive.

11. An error detection system according to claim 1 wherein said fourth means coupled to said demodulator means includes a threshold circuit coupled to the output of said filter circuit of said demodulator means for providing an output signal when the signal therefrom exceeds a given amplitude.

References Cited

UNITED STATES PATENTS

| | | | |
|---|---|---|---|
| 2,801,338 | 7/1957 | Keller | 250—36 |
| 2,851,638 | 9/1958 | Wittenberg et al. | 315—135 |
| 2,853,633 | 9/1958 | McVey | 307—88.5 |
| 2,872,596 | 2/1959 | Day et al. | 307—88.5 |
| 2,957,137 | 10/1960 | Robinson | 324—83 |
| 3,078,448 | 2/1963 | O'Brien | 340—174.1 |
| 3,098,162 | 7/1963 | Fischman et al. | 307—88.5 |
| 3,112,412 | 11/1963 | Dyer | 307—88.5 |
| 3,179,813 | 4/1965 | Vernot et al. | 307—88.5 |
| 3,202,834 | 8/1965 | Pingry et al. | 307—88.5 |
| 3,296,525 | 1/1967 | Sakuma | 324—68 |

MALCOLM A. MORRISON, Primary Examiner.

K. MILDE, C. E. ATKINSON, Assistant Examiner.